(12) United States Patent
Sullivan

(10) Patent No.: US 12,269,144 B2
(45) Date of Patent: Apr. 8, 2025

(54) DEVICES FOR REMOVING TREADS FROM WHEELS, AND RELATED METHODS

(71) Applicant: Sullivan Ag Services LLC, Silex, MO (US)

(72) Inventor: Sam Sullivan, Silex, MO (US)

(73) Assignee: Sullivan Ag Services LLC, Silex, MO (US)

( * ) Notice: Subject to any disclaimer, the term of this patent is extended or adjusted under 35 U.S.C. 154(b) by 471 days.

(21) Appl. No.: 17/480,013

(22) Filed: Sep. 20, 2021

(65) Prior Publication Data

US 2022/0088738 A1 Mar. 24, 2022

Related U.S. Application Data

(60) Provisional application No. 63/082,934, filed on Sep. 24, 2020.

(51) Int. Cl.
*B24B 5/36* (2006.01)
*B29D 30/54* (2006.01)

(52) U.S. Cl.
CPC .............. *B24B 5/366* (2013.01); *B29D 30/54* (2013.01); *B29D 2030/541* (2013.01)

(58) Field of Classification Search
CPC .. B24B 5/366; B29D 30/54; B26D 2030/541; B60C 25/20; B60C 25/14; B60C 25/142
USPC ................................ 157/13, 14, 21; 111/190
See application file for complete search history.

(56) References Cited

U.S. PATENT DOCUMENTS

| | | | | |
|---|---|---|---|---|
| 656,057 A * | 8/1900 | Stephens | ............... | B60C 25/132 157/14 |
| 1,615,469 A * | 1/1927 | Mckenzie | ............. | B60C 25/132 157/14 |
| 5,117,885 A * | 6/1992 | Crawford | .................. | B60C 7/24 152/382 |
| 5,896,932 A * | 4/1999 | Bruns | ..................... | A01C 5/068 172/753 |
| 7,987,889 B1 * | 8/2011 | Story | .................. | B60C 25/0521 157/14 |

* cited by examiner

*Primary Examiner* — Hadi Shakeri
(74) *Attorney, Agent, or Firm* — Harness, Dickey & Pierce, P.L.C.

(57) ABSTRACT

A device for removing a tread from a wheel (e.g., a closing wheel of a planter, a gauge wheel of a planter, a gauge wheel of a cultivator, a gauge wheel of seed drill etc.) includes a body configured to support the wheel, and a fastener coupled to the body. The fastener is configured to engage the wheel when the wheel is supported by the body, and position the wheel on the body, and then compress the wheel against the body to thereby allow removal of a tread from the wheel.

16 Claims, 15 Drawing Sheets

DEVICES FOR REMOVING TREADS FROM WHEELS, AND RELATED METHODS

CROSS-REFERENCE TO RELATED APPLICATION

This application claims the benefit of, and priority to, U.S. Provisional Application No. 63/082,934, filed on Sep. 24, 2020. The entire disclosure of the above-referenced application is incorporated herein by reference.

FIELD

The present disclosure generally relates to devices and methods for use in removing, changing, replacing, etc. treads from/on wheels, such as closing wheels of planters, gauge wheels of planters, gauge wheels of cultivators, gauge wheels of seed drills, etc.

BACKGROUND

This section provides background information related to the present disclosure which is not necessarily prior art.

Planters, seed drills, etc. are used to plant seeds in fields. In doing so, the planters, seed drills, etc. are often pulled behind tractors across the fields. And, as the planters, seed drills, etc. progress across the fields, they dispense seeds to the ground in rows through the fields. Other machinery is also used to cultivate soil, etc. in connection with preparing the soil, etc. for such planting.

SUMMARY

This section provides a general summary of the disclosure, and is not a comprehensive disclosure of its full scope or all of its features.

Example embodiments of the present disclosure generally relate to devices for removing treads from wheels (e.g., from closing wheels of planters, gauge wheels of planters, gauge wheels of cultivators, gauge wheels of seed drills, etc.). In one example embodiment, such a device generally includes a body configured to support a wheel (e.g., a closing wheel of a planter, etc.); and a fastener coupled to the body. The fastener is configured to engage the wheel when the wheel is supported by the body and to position the wheel on the body. The fastener is also configured to compress the wheel against the body to thereby allow removal of a tread from the wheel while the wheel is supported on the body.

Example embodiments of the present disclosure also generally relate to methods for removing treads from such wheels. In one example embodiment such a method generally includes positioning a fastener of a tread removal device through an opening of a wheel (e.g., a closing wheel of a planter, a gauge wheel of a planter, a gauge wheel of a cultivator, a gauge wheel of a seed drill, etc.); supporting the wheel on a body of the tread removal device, such that the wheel is disposed at least partly within an opening of the tread removal device; and actuating a clamp of the fastener to compress the wheel against the body, to thereby allow removal of a tread from the wheel while the wheel is supported on the body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION

Example embodiments will now be described more fully with reference to the accompanying drawings. The description and specific examples included herein are intended for purposes of illustration only and are not intended to limit the scope of the present disclosure.

Figure 1:
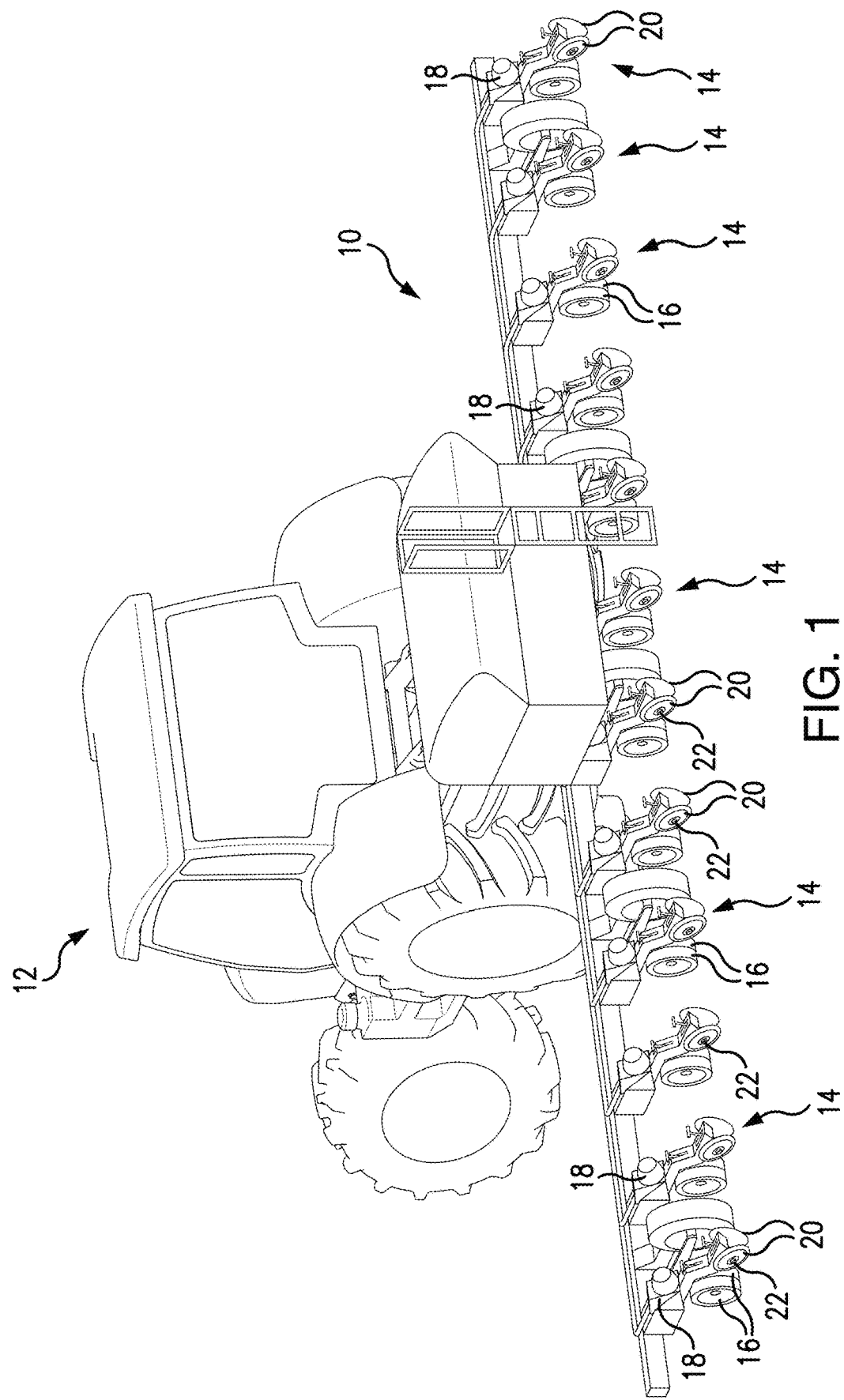
FIG. 1 is a perspective view of a planter configured to plant seed in a field.

FIG. 1 illustrates a conventional planter 10 configured to plant seeds in a field. The planter 10 is illustrated as connected to a tractor 12, which then tows or pulls the planter 10 behind the tractor 12 to plant the seeds. The planter 10 includes multiple row units 14 spaced along the planter 10. Each of the row units 14 includes two disc openers 16 configured to create a furrow in the ground generally ahead of the row unit 14, a seed meter 18 configured to discharge seeds from the row unit 14 into the furrow, and a pair of closing wheels 20 configured to close (or stitch) the furrow once the seeds are planted and cover the seeds with dirt. In connection therewith, the closing wheels 20 are connected to the row units 14 by fasteners 22 extending through central openings of the wheels 20 (through central bearings of the wheels 20). In the illustrated embodiment, the planter 10 includes twelve row units 14. However, in other embodiments, the planter 10 may include more than or less than twelve row units 14 (e.g., the planter 10 may include twenty-four row units 14, etc.).

Figure 2:
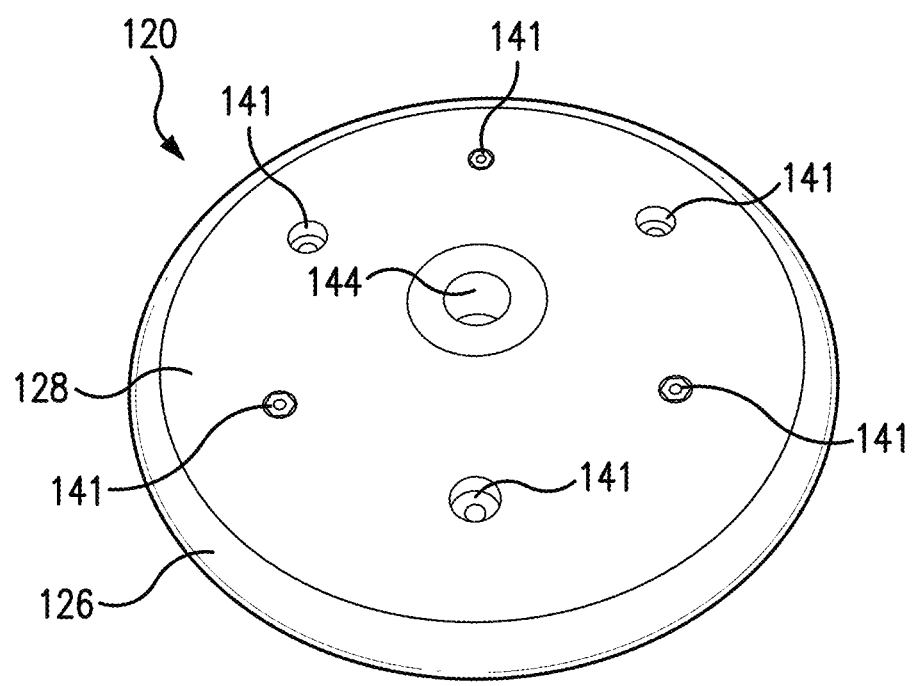
FIG. 2 is a perspective view of a closing wheel suitable for use with the planter of FIG. 1.
Figure 3:
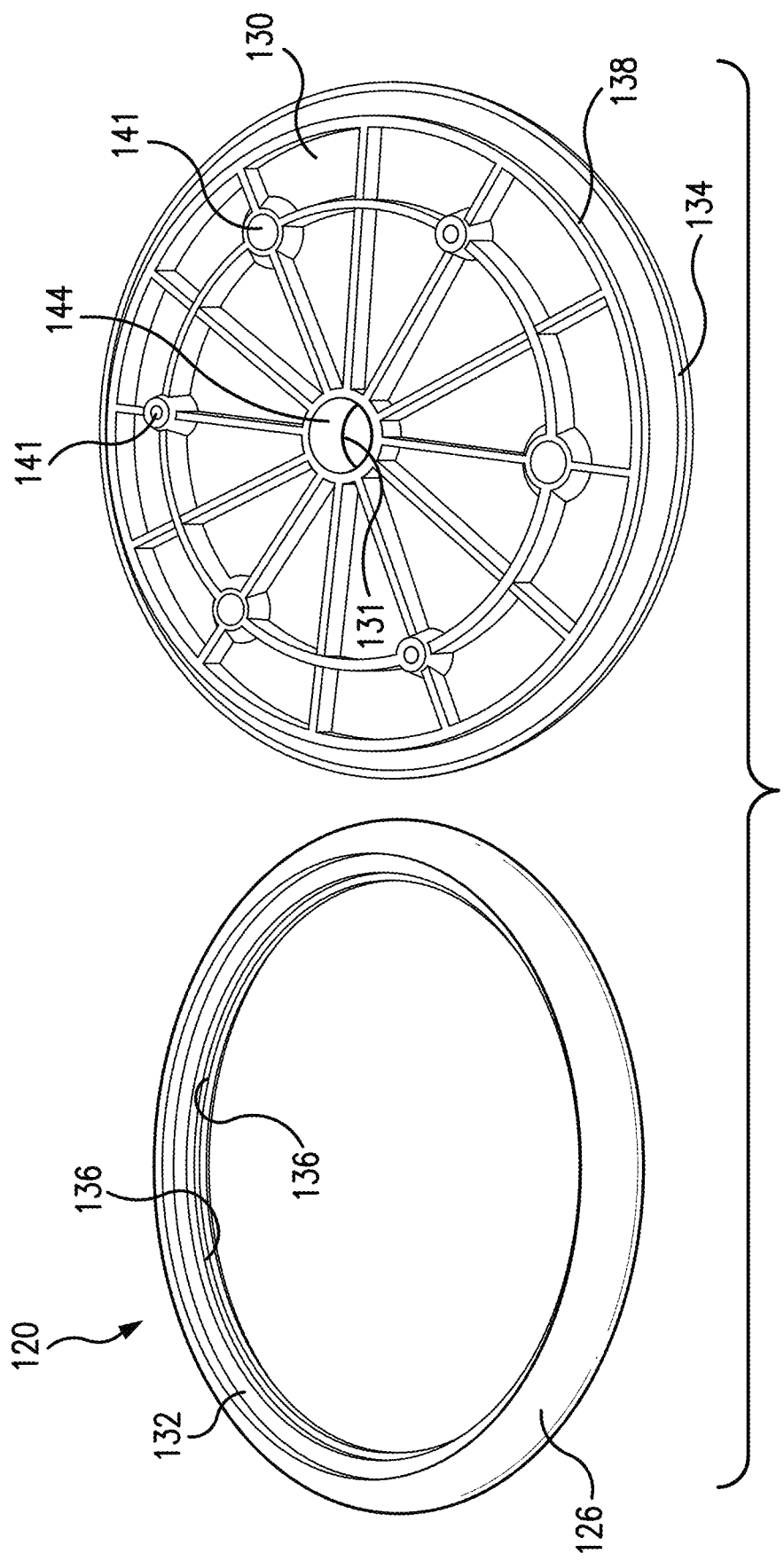
FIG. 3 is a fragmentary exploded view of the closing wheel of FIG. 2.
Figure 4:
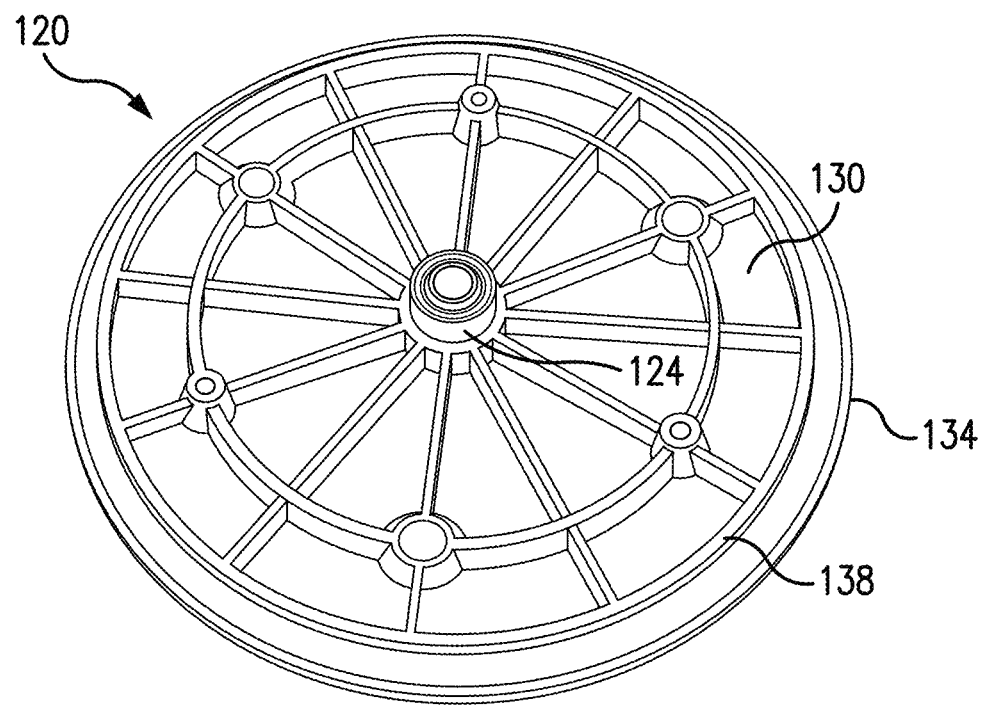
FIG. 4 is another fragmentary view of the closing wheel of FIG. 2.
Figure 5:
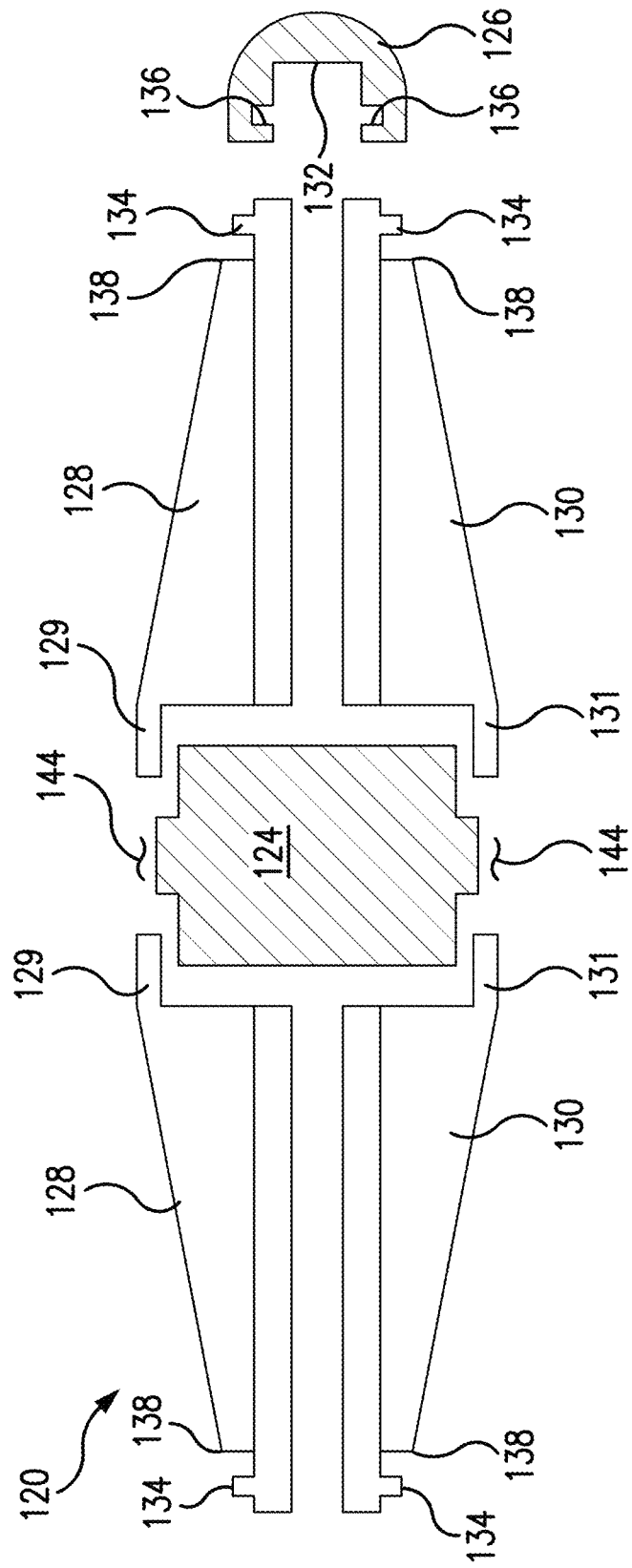
FIG. 5 is a schematic, fragmentary exploded view of the closing wheel of FIG. 2.

FIGS. 2-5 illustrate an example embodiment of a closing wheel 120 that may be used with the planter 10 of FIG. 1. The closing wheel 120 is generally circular in shape and may be constructed from suitable material such as rubber, plastic, metal, combinations thereof, etc. (e.g., to facilitate closing (or stitching) a furrow formed by the planter 10 once seeds are planted in the furrow, by covering the seeds with dirt; etc.). In the illustrated embodiment, the closing wheel 120 includes a generally smooth, generally circular outer tread 126, upper and lower clam shells 128, 130, and a central bearing 124 (FIGS. 4 and 5). When assembled, the bearing 124 is disposed within central openings 144 of the clam shells 128, 130 (generally held between lips 129, 131 of the clam shells 128, 130 (FIG. 5)) and the clam shells 128, 130 are in generally face-to-face arrangement, with a circumferential lip 134 of each clam shell 128, 130 secured within a channel 136 of an inner portion 132 of the tread 126 (thereby snap fitting the claim shells 128, 130 together generally within the tread 126, etc.). The inner portion 132 of the tread 126 is generally disposed between, around, etc. shoulders 138 of the clam shells 128, 130, and the tread 126 then extends around a perimeter of the clam shells 128, 130 (FIG. 2). In this arrangement, the clam shells 128, 130 are generally retained together by the tread 126 (such that the positioning of the lips 134 of the clam shells 128, 130 within the inner portion 132 of the tread (and, specifically, within the channels 136 thereof) generally inhibits the clam shells 128, 130 from separating, coming apart, etc.). Fasteners 140 (e.g., bolts, etc.) (FIG. 8), located toward a perimeter of the closing wheel 120, are then used to further secure (e.g., hold, lock, etc.) the clam shells 128, 130 together (via openings 141 (FIG. 2)) and the closing wheel 120 in the assembled arrangement (e.g., against the clam shells 128, 130 separating, etc.). In the illustrated embodiment, three of the fasteners 140 are inserted through the upper clam shell 128 (and secured into corresponding receptacles positioned in the lower clam shell 130 (e.g., into nuts positioned in hex shaped depressions molded into the lower clam shell 130, etc.)), and three are inserted through the lower clam shell 130 (and secured into corresponding receptacles positioned in the upper clam shell 128 (e.g., into nuts positioned in hex shaped depressions molded into the upper clam shell 128, etc.)). It should be appreciated that the clam shells 128, 130 are substantially the same (despite their reference herein as upper and lower clam shells 128, 130).

Figure 6:
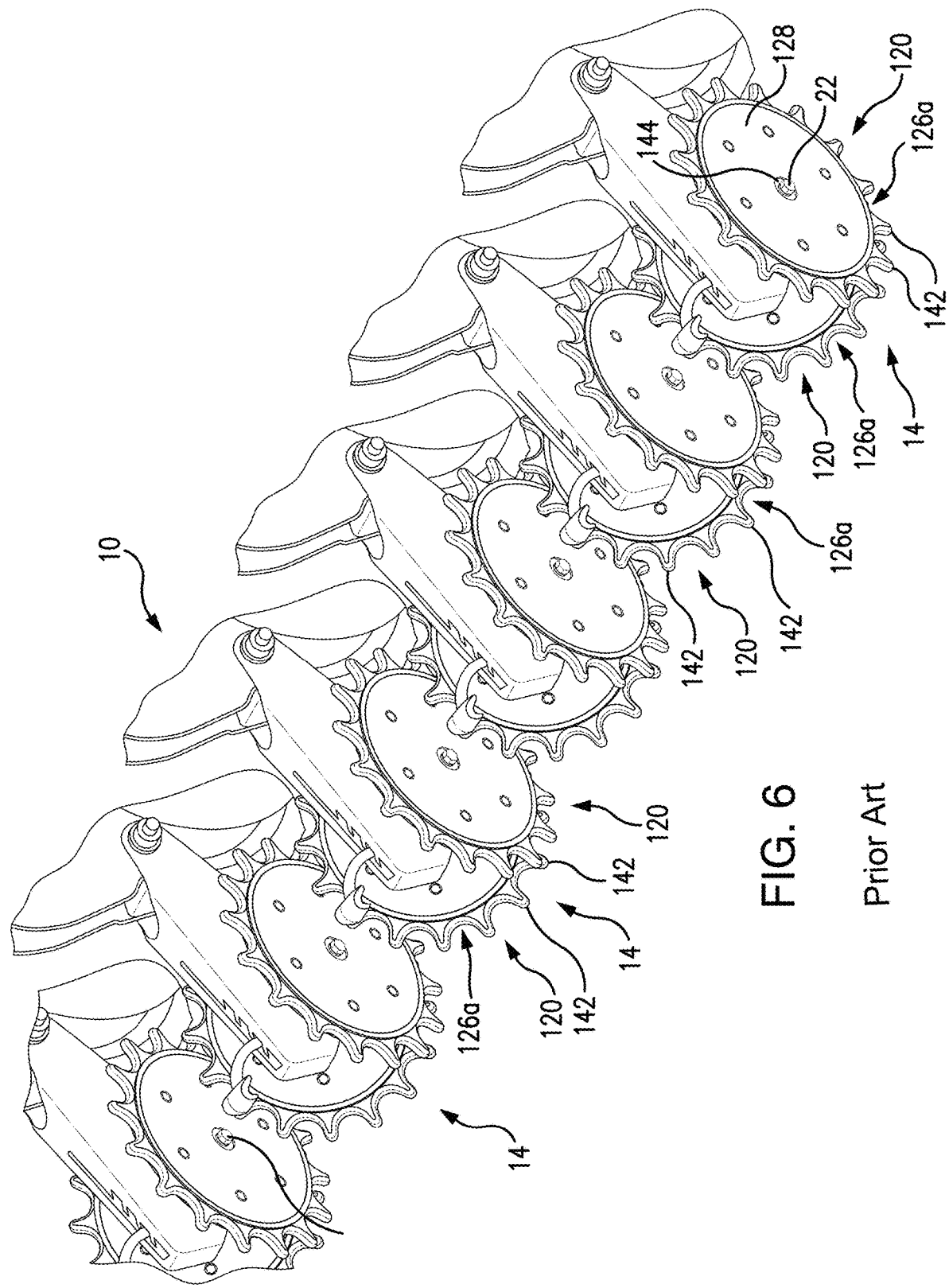
FIG. 6 is a fragmentary perspective view of the planter of FIG. 1 including the closing wheel of FIG. 2, with a different tread installed thereto and with the closing wheel attached to a planter.
Figure 7:
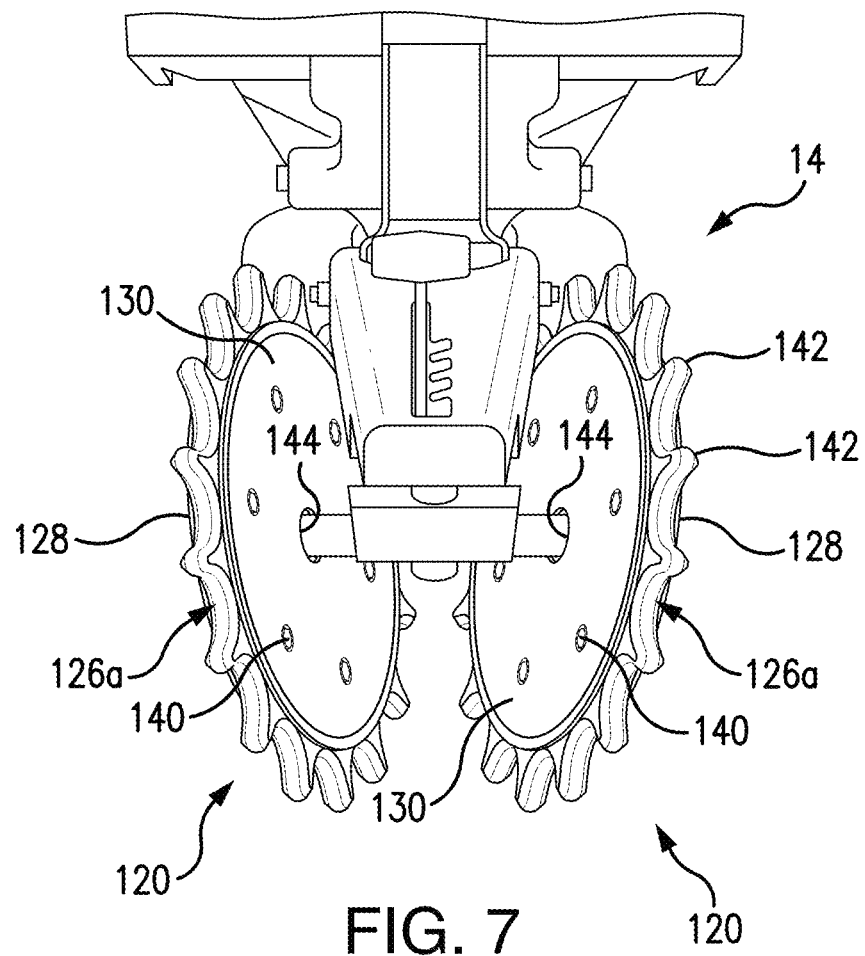
FIG. 7 is another fragmentary perspective view of the planter of FIG. 1 with the closing wheel of FIG. 6 attached to the planter.
Figure 8:
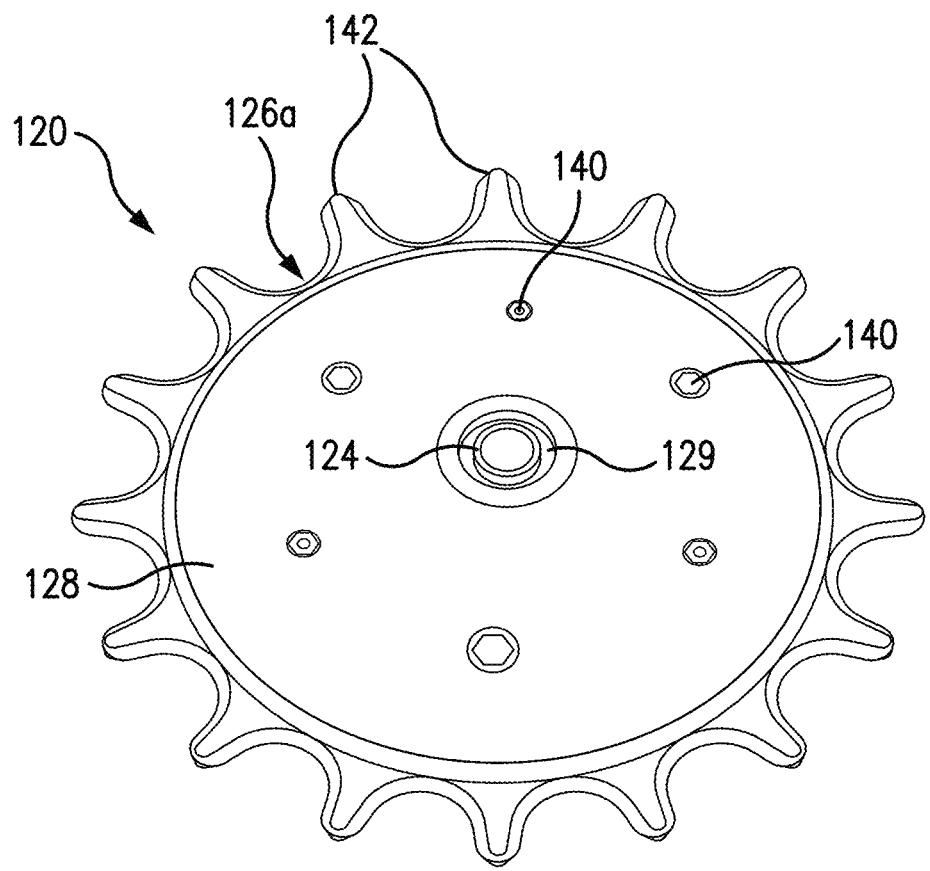
FIG. 8 is a perspective view of the closing wheel of FIG. 6 removed from the planter.

With additional reference to FIGS. 6-8, the smooth outer tread 126 of the closing wheel 120 (of FIG. 2) (or of closing wheel 20 of FIG. 1) may be replaced (i.e., the closing wheel 120 or the closing wheel 20, etc. may be modified to include) an outer tread 126a having multiple fingers 142 projecting generally radially outward from the tread 126a. The fingers 142 may provide improved stitching, for example, when planting seeds in certain types of soil, etc. In connection therewith, the closing wheel 120 illustrated in FIGS. 6-8 (having the tread 126a) is assembled in the same manner as previously described (by way of an inner portion and channels disposed generally within the tread 126a, and the clam shells 128, 130 then held together by the channels and fasteners 140), with the tread 126a then extending around the perimeter of the clam shells 128, 130. Once the tread 126a is installed, the closing wheel 120 may be reattached to one of the row units 14 of the planter 10, by way of the fastener 22 extending through corresponding aligned central openings 144 of the clam shells of the closing wheel 120 (and the bearing 124 disposed therein). It should be appreciated that other treads (other than tread 126 and tread 126a) may be installed to and/or removed from the closing wheel 120 within the scope of the present disclosure (i.e., the present disclosure is not limited to changing, replacing, etc. the treads 126 and 126a, but may be used with other treads of closing wheels).

With that said, FIGS. 9-15 illustrate an example embodiment of a tread changing device 250 suitable for use in replacing, changing, etc. the tread 126 and/or the tread 126a of the closing wheel 120 (and/or any other suitable closing wheel tread, for example, a tread of one of closing wheels 20, etc.), of the planter 10, with another tread (e.g., a same type of tread as that being removed, a different type of tread, etc.). Again, it should be appreciated that the tread changing device 250 is not limited to the tread 126 or tread 126a, and may be used to replace, change, etc. other treads of closing wheels within the scope of the present disclosure. It should also be appreciated that the device may be used to remove, replace, change, etc. treads of other wheels, other than closing wheels of planters, within the scope of the present disclosure. For instance, the device 250 may similarly be used to remove, replace, change, etc. treads of gauge wheels of planters, gauge wheels of cultivators, gauge wheels of seed drills, etc. (e.g., where such other wheels have a similar construction to the closing wheel 120 described above, including a pair of clam shells held together via a tread extending around a perimeter of the clam shells with a bearing seated within central openings of the clam shells; etc.).

As shown in FIGS. 9-12, the device 250 generally includes a body 252 configured to support the closing wheel 120, in connection with replacing or changing the tread (e.g., the tread 126, the tread 126a, etc.) thereof. In the illustrated embodiment, the body 252 is generally conical in shape. However, the body 252 may have other shapes in other embodiments (e.g., tubular shapes, box shapes, etc.).

The body 252 of the device 250 includes a base portion 254 and support portion 256. The base portion 254 is configured to support the device 250, for example, on a ground surface or another structure, etc. And, the support portion 256 is configured to receive and hold the closing wheel 120 in a position to replace or change the tread. In connection therewith, the support portion 256 is configured to receive the closing wheel 120 in a position thereon such that the closing wheel 120 is generally arranged on its side (e.g., such that the closing wheel 120 is generally lying on (or oriented on) one of the clam shells 128, 130, etc.) (see, FIG. 9 in which the device 250 is supporting closing wheel 120 having tread 126a). And, a perimeter portion of the closing wheel 120, then, is configured to rest on a rim 258 of the support portion 256 (extending around a perimeter of the device 250 (e.g., around a perimeter of the body 252 of the device 250, etc.)). In particular in this example, the rim 258 is configured to engage the tread 126a of the closing wheel 120 such that the closing wheel 120 is generally supported on the device 250 via such engagement of the tread on the rim 258. In the illustrated embodiment, the rim 258 of the support portion 256 is generally coextensive with a wall 260 of the body 252 of the device 250. In other embodiments, though, the rim 258 may be separate from a wall(s) of the device 250, and/or may not be coextensive with a wall(s) of the device 250 (e.g., the rim 258 may include spaced apart portions extending around the perimeter of the body 252 of the device 250, etc.). Further, in the illustrated embodiment the rim 258 is illustrated as including openings there around. However, such openings are provided for illustration only and their illustrated configuration is not required in all embodiments, whereby in other example embodiments devices may include rims with more openings, with fewer openings, with other configurations of openings, or with no openings.

Figure 11:
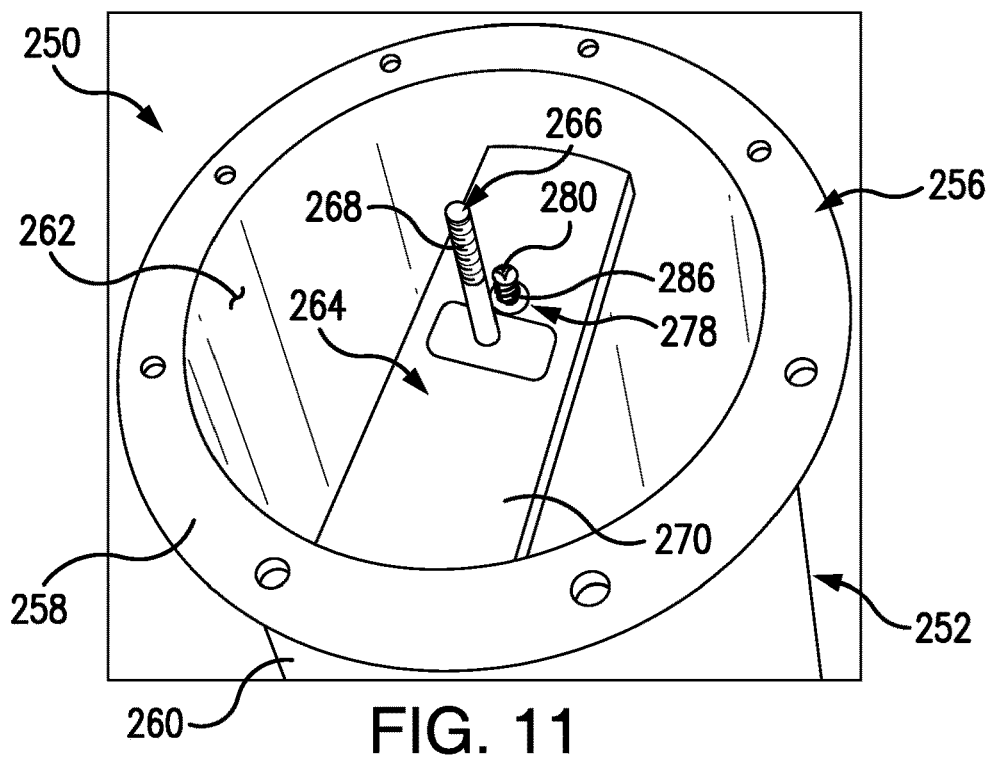
FIG. 11 is an upper perspective view of the tread removal device of FIG. 9.
Figure 12:
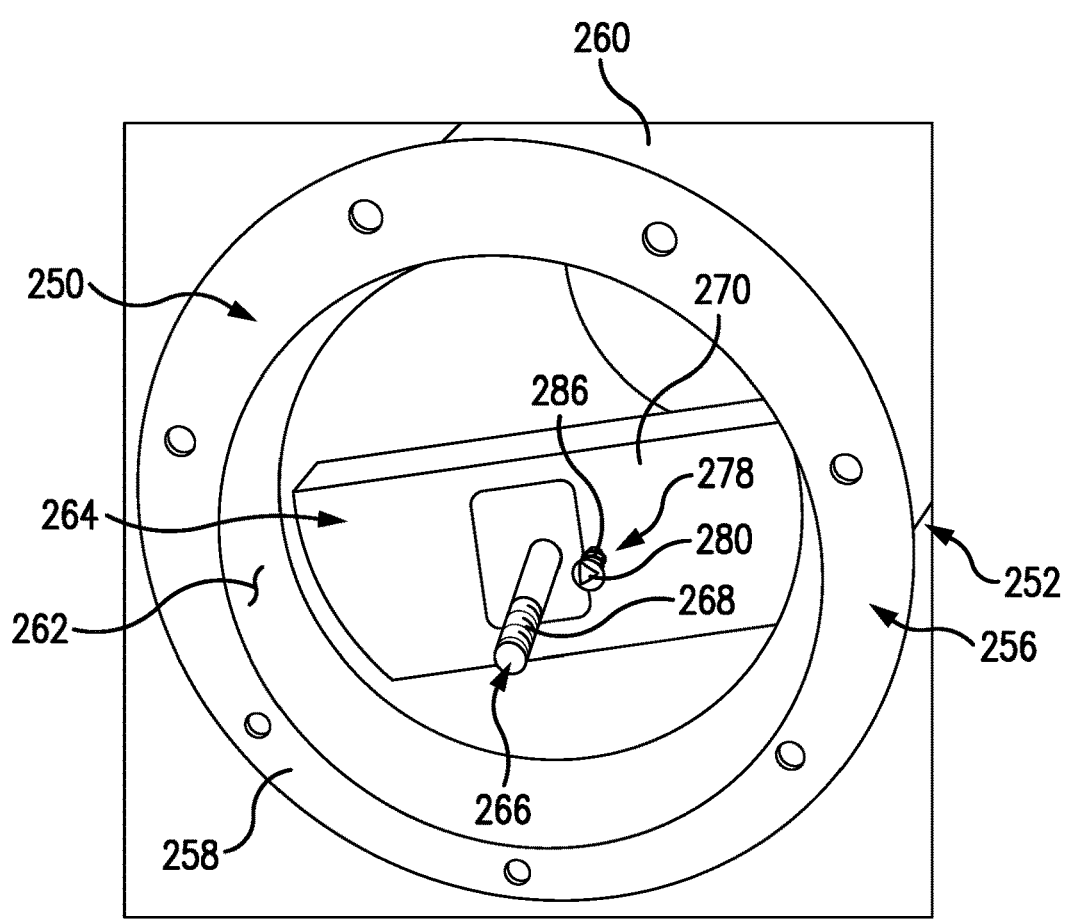
FIG. 12 is another upper perspective view of the tread removal device of FIG. 9.

The support portion 256 of the device 250 generally defines an opening 262 (FIGS. 11 and 12). The rim 258 of the support portion 256, then, extends generally around the opening 262. In the illustrated embodiment, the rim 258 extends substantially entirely around the opening 262. In other embodiments, though, the rim 258 may extend only partly around the opening 262 of the body 252, etc. (e.g., the rim 258, again, may include spaced apart portions extending around the opening 262; etc.). In addition, the opening 262 defines a diameter such that part of the lower clam shell 130 of the closing wheel 120 extends (or is capable of extending) at least partly into the opening 262 when the closing wheel 120 is positioned on the device 250, and such that (at the least) the tread of the closing wheel 120 is supported on the rim 258 of the support portion 256. That said, a diameter of the opening 262 may be based on a diameter of the closing wheel 120, such that the diameter of the opening 262 is at least as large as a diameter of each of the clam shells 128, 130 of the closing wheel 120 in order to allow at least part of the tread 126*a* (or other tread) of the closing wheel 120 (e.g., at least about 0.125 inches of the tread, at least about 0.25 inches of the tread, the entire tread, etc.) to then engage (e.g., rest on, etc.) the rim 258 of the device 250 (and to ensure that the clam shells 128, 130 do not engage the rim 258 (e.g., to ensure that the outer perimeters of the clam shells 128, 130 are disposed inward of the rim 258 (e.g., generally above the opening 262, etc.), to ensure that the outer perimeters of the clam shells 128, 130 are disposed within the opening 262, etc.)). As such, in the illustrated embodiment, where the clam shells 128, 130 of the closing wheel 120 each have a diameter of about 10.625 inches (and where the closing wheel 120 itself has a diameter of about 12 inches), for example, the opening 262 may define (without limitation) a diameter of between about 10.75 inches (e.g., a diameter that is about 0.125 inches greater than a diameter of each of the clam shells 128, 130, etc.) and about 11.75 inches (e.g., a diameter that is about 1.125 inches greater than a diameter of each of the clam shells 128, 130, etc.) (e.g., so that no part of the lower clam shell 130 rests on or engages the rim 258, etc.).

A cross member 264 is disposed within the opening 262 of the device 250 generally below the rim 258 and extends, in the illustrated embodiment, generally from one side of the device 250 to an opposing side of the device 250 (e.g., along a diameter of the device 250, etc.). In connection therewith, the cross member 264 is coupled to an inner portion of the wall 260 of the device 250 (e.g., welded, connected by one or more fasteners, etc.). It should be appreciated that the cross member 264 may be arranged differently in other embodiments. For example, the cross member 264 may extend only part way across the device 250, may define a generally cross (or "t" or "x") shape extending across the device 250 (e.g., such that the cross member includes two legs each extending from one side of the device 250 to an opposite side of the device 250, etc.), may fill the entire opening 262 (e.g., may define a generally circle shape consistent with a shape of the opening 262, etc.) or any part thereof, etc. Further, in some embodiments, the cross member 264 may be formed integrally with the wall 260 of the device 250.

Figure 13:
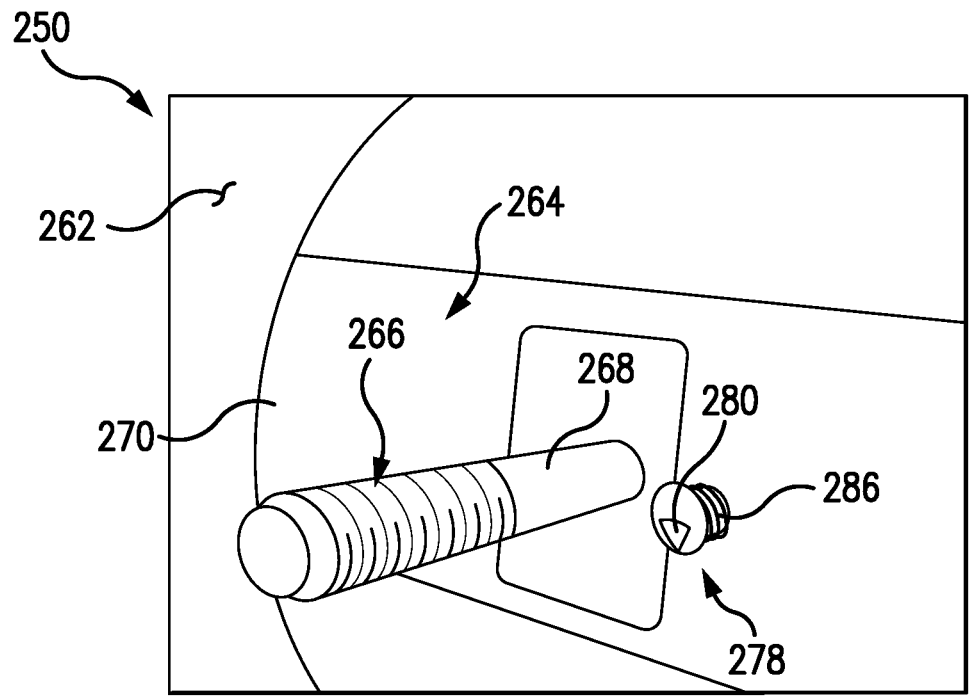
FIG. 13 is another upper perspective view of the tread removal device of FIG. 9.
Figure 14:
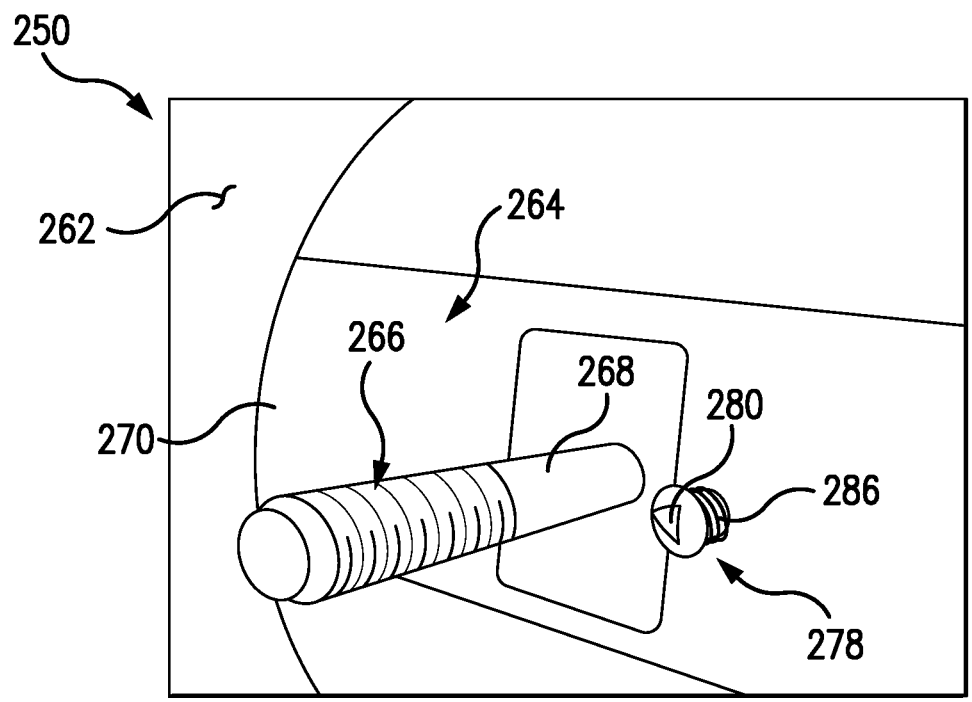
FIG. 14 is another upper perspective view of the tread removal device of FIG. 9.
Figure 15:
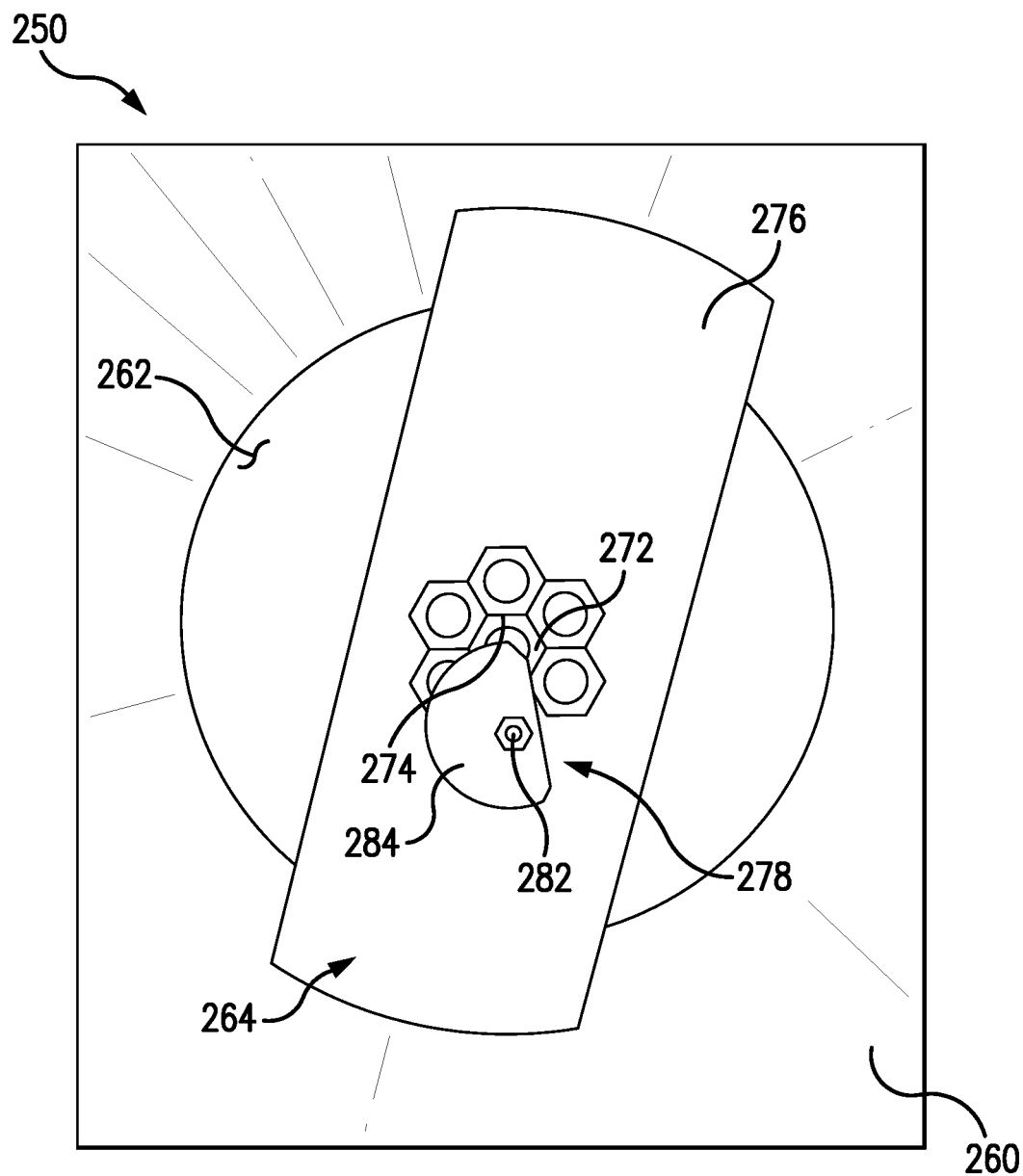
FIG. 15 is an interior perspective view of the tread removal device of FIG. 9, illustrating a lower portion of a cross member disposed generally within the device.

With additional reference to FIGS. 13-15, the cross member 264 of the device 250 includes a fastener 266 configured to receive (e.g., position, center, etc.) the closing wheel 120 on the support portion 256 of the device 250 (and/or couple the closing wheel 120 to the support portion 256). For instance, the fastener 266 may be positioned relative to the cross member 264 (and the opening 262 of the device 250) in order to position the closing wheel 120 on the device 250 so that the tread of the closing wheel 120, for example, is supported on the rim 258 of the support portion 256 (e.g., generally centrally on the device 250, etc.). In the illustrated embodiment, the fastener 266 includes a shaft 268 extending generally upward from an upper surface 270 of the cross member 264. In particular, the shaft 268 of the fastener 266 extends generally upward through the opening 262, and an end portion of the shaft 268 is disposed generally above the rim 258 of the support portion 256 (so that the closing wheel 120 can be positioned on the fastener 266, via the bearing 124 and the openings 144 of the clam shells 128, 130, with the shaft 268 extending through the closing wheel 120 (e.g., so that an end portion of the shaft 268 extends completely through the closing wheel 120, etc.)). That said, the shaft 268 of the fastener 266 may extend above the rim 258 of the support portion 256 by a distance of at least about one inch or more (e.g., by a distance of about 1.5 inches, etc.) (e.g., where the distance may depend on a thickness of the closing wheel 120 in order to allow the end portion of the fastener to extend completely through the closing wheel 120, etc.).

In general, the cross member 264 and the fastener 266 are located in the device 250 so that the fastener 266 generally aligns (e.g., vertically, etc.) with the bearing 124 and the central openings 144 of the clam shells 128, 130 of the closing wheel 120 (when the closing wheel 120 is positioned on the device 250 and when the tread of the closing wheel 120 is supported on the rim 258 of the device 250). In the illustrated embodiment, the fastener 266 is located generally centrally within the opening 262 of the device 250 (so as to generally align with the bearing 124 and the central openings 144 of the clam shells 128, 130). In addition in the illustrated embodiment, the cross member 264 and the fastener 266 are positioned (generally vertically) in the device 250 so that the fastener 266 extends completely through the bearing 124 (and through the central openings 144 of the clam shells 128, 130) and so that the lower clam shell 130 does not engage the cross member 264 (at least until after the clam shells 128, 130 are separated from the tread).

The fastener 266 also includes a head 272 disposed within a recess 274 in a lower surface 276 of the cross member 264 (FIG. 15). The recess 274 is shaped to generally match a shape of the head 272 of the fastener 266 to thereby inhibit the fastener 266 from rotating, when the head 272 is in the recess 274. For instance, in the illustrated embodiment, the fastener 266 includes a bolt having a threaded shaft 268 (to thereby couple the closing wheel 120 to the support portion 256) and a hex-shaped head 272. The recess 274, then, may also be generally hex shaped to thereby match the shape of the head 272 of the bolt (and to thereby inhibit the bolt from rotating relative to the cross member 264 (and the device 250), when the head 272 is in the recess 274).

The cross member 264 of the device 250 further includes a lock 278 disposed adjacent the fastener 266. The lock 278 is configured to selectively hold, retain, secure, etc. the head 272 of the fastener 266 in the recess 274 of the cross member 264. In this manner, when the lock 278 is engaged (to hold, retain, secure, etc. the head 272 of the fastener 266 in the recess 274), the fastener 266 cannot rotate relative to the cross member 264 (and the device 250). And, when the lock 278 is disengaged, the head 272 of the fastener 266 may be removed from the recess 274 of the cross member 264 and, as desired, the fastener 266 may be removed from the cross member 264 (e.g., to replace the fastener 266 with a different fastener, to replace the fastener with a different length fastener to accommodate different closing wheels (e.g., closing wheels having different thicknesses, etc.), to replace the fastener 266 if it is damaged or worn out, etc.).

That said, in the illustrated embodiment the lock 278 includes a bolt 280 coupled to the cross member 264, via a nut 282 (FIG. 14). The nut 282 and bolt 280 couple a plate 284 to the cross member 264, adjacent the lower surface 276 thereof. The plate 284, then, is configured to rotate (via rotation of the bolt 280) to either cover the recess 274 (and thereby hold, retain, secure, etc. the head 272 of the fastener 266 in the recess 274) or uncover the recess 274 (and thereby allow the head 272 of the fastener 266 to be removed from the recess 274). In connection therewith, a spring 286 is disposed between a head of the bolt 280 and the upper surface 270 of the cross member 264 (e.g., to inhibit unintended, unwanted, undesired, etc. movement of the bolt 280, etc.). As such, when desired to rotate the plate 284, the head of the bolt 280 may be moved (e.g., pushed, etc.) generally downward (toward the cross member 264), in order to compress the spring 286 and move the plate 284 away from the lower surface 276 of the cross member 264. In this position, the bolt 280 and plate 284 may then be rotated as desired (to a position to retain the head 272 of the fastener 266 in the recess 274 (FIG. 14), or to a position to allow the head 272 of the fastener 266 to be removed from the recess 274). As shown in FIGS. 11-14, the head of the bolt 280 may include an indicator (e.g., an arrow, a wedge, etc.) indicating a rotational position of the plate 284 (broadly, a position of the lock 278), relative to the fastener 266. For instance, in FIGS. 11-13, the indicator shows the plate 284 (broadly, the lock 278) in a position retaining the head 272 of the fastener 266 in the recess 274 of the cross member 264. And, in FIG. 14, the indicator shows the plate 284 (broadly, the lock 278) in a position allowing the head 272 of the fastener 266 to be removed from the recess 274 of the cross member 264.

Figure 16:
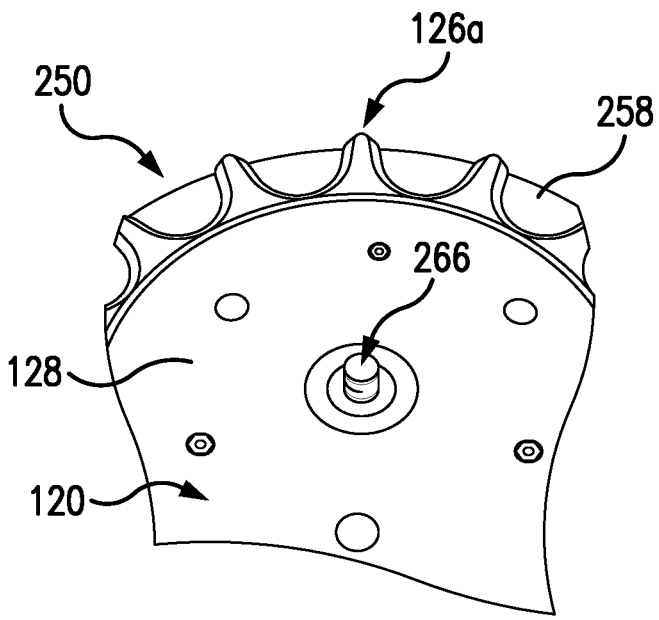
FIGS. 16-18 illustrate operation of the tread removal device of FIG. 9 in removing the tread from the closing wheel of the planter.

Operation of the device 250 for use in replacing the tread 126 (or the tread 126a or any other suitable tread) of the closing wheel 120, of the planter 10, with another tread will be described next with additional reference to FIGS. 16-18. Initially, the device 250 is positioned with the base portion 254 on a desired surface (e.g., the ground, etc.), and the support portion 256 facing generally upward. And, the fasteners 140 (e.g., the nuts and bolts, etc.) located toward the perimeter of the closing wheel 120 are removed therefrom. The closing wheel 120 is then positioned on the support portion 256 on its side, generally over the opening 262, with a perimeter portion of the closing wheel 120 (e.g., the tread, etc.) disposed on top of (e.g., in contact with, etc.) the rim 258 of the support portion 256 (FIG. 16). And, part of the lower clam shell 130 of the closing wheel 120 extends at least partly down and into the opening 262 of the device 250 (and spaced above the cross member 264). In this position, the fastener 266 of the device 250 extends through the bearing 124 (and central openings 144 of the clam shells 128, 130) of the closing wheel 120 (when the end portion of the fastener 266 positioned generally above the closing wheel 120). That said, it should be appreciated that the fasteners 140 of the closing wheel 120 may be removed prior to the closing wheel 120 being positioned on the device 250, or after.

Figure 9:
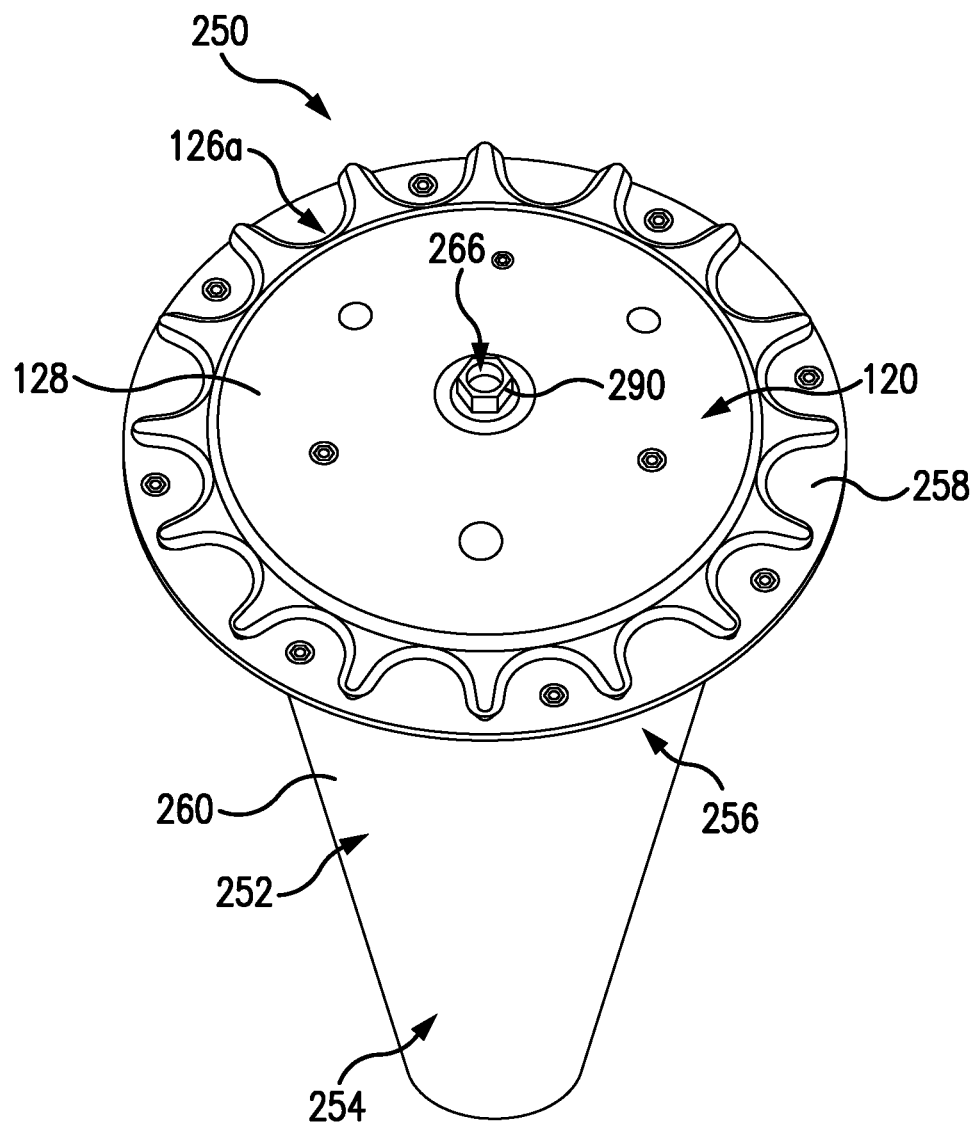
FIG. 9 is a perspective view of a tread removal device suitable for use in removing a tread of a closing wheel of a planter, for example, so that the tread can be replaced with another tread.
Figure 10:
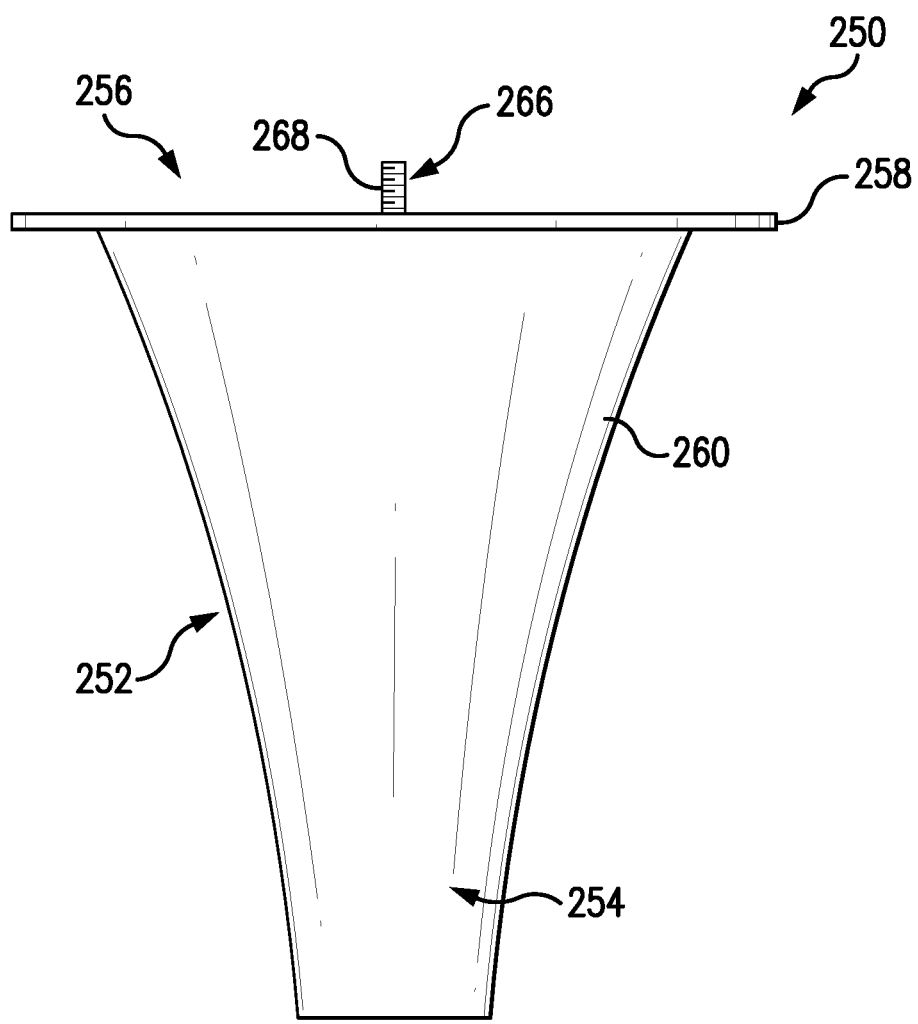
FIG. 10 is a side elevation view of the tread removal device of FIG. 9.
Figure 17:
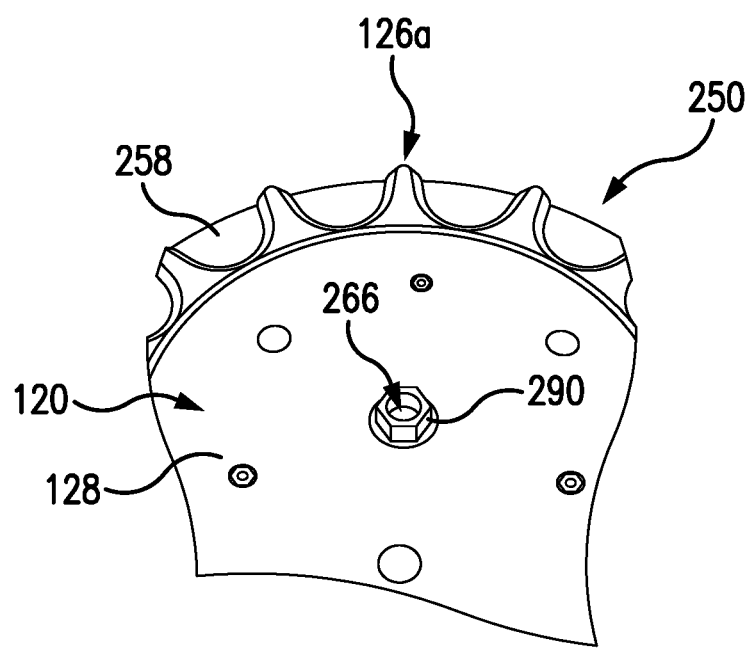
Figure 18:
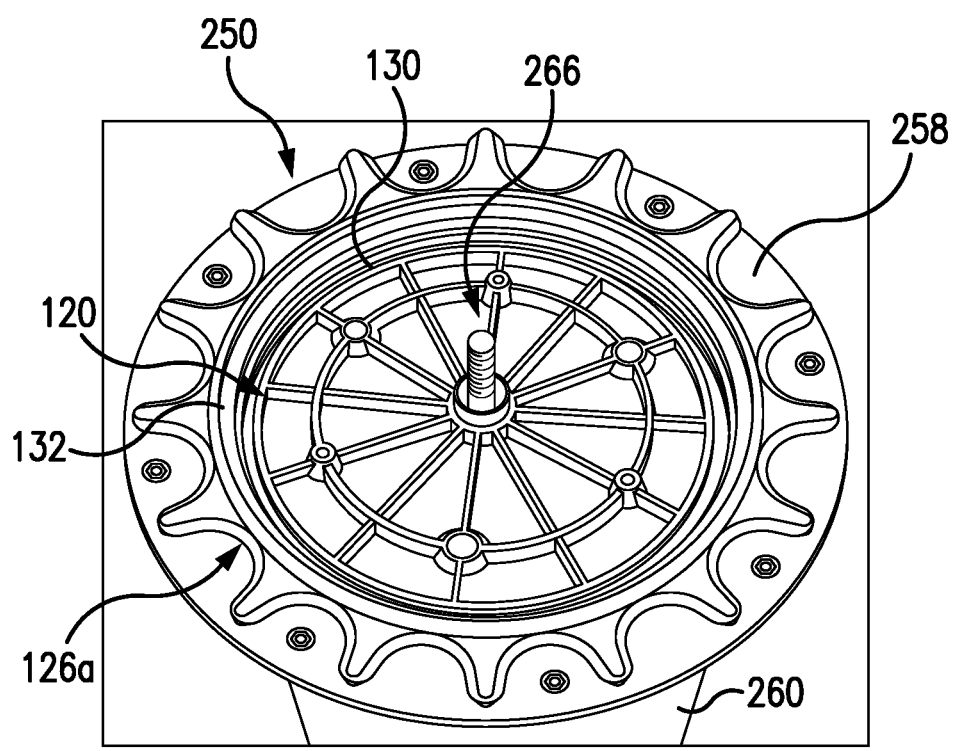

Next, a clamp 290 (e.g., a nut and washer, etc.) of the fastener 266 is actuated to generally compress the closing wheel 120 against the rim 258 of the support portion 256 (broadly, against the body 252 of the device 250) (FIGS. 9 and 17). In the illustrated embodiment, the clamp 290 includes a washer and a nut configured to fit/thread onto the shaft 268 of the fastener 266 (where the shaft 268 extends through the central openings 144 of the clam shells 128, 130). The washer and nut, then, are configured to fit within the central opening 144 of the upper clam shell 128 (and within the lip 129 thereof) (e.g., such that the clamp 290 (e.g., the nut and washer, etc.) have a diameter less than a diameter defined by the central opening 144 at the lip 129 (e.g., a diameter of less than about 1.5 inches, etc.), etc.). As such, as the nut (broadly, the clamp 290) is threaded down on the shaft (or is otherwise moved relative to the fastener 266 (e.g., by means other than threads, etc.)), it (and the washer) moves into the central opening 144 of the upper clam shell 128 and engages the bearing 124 (without engaging the upper clam shell 128) and pushes the bearing 124 downward toward the lower clam shell 130 (such that the bearing 124 (e.g., a shoulder of the bearing 124, etc.) pushes against the lip 131 associated with the central opening 144 of the lower clam shell 130). In doing so, the tread of the closing wheel 120 pushes against the rim 258 of the device 250 (which resists any downward movement of the tread). Continued movement of the nut down the shaft of the fastener 266 then causes the bearing 124 to push the lower clam shell 130 further downward until it (and the bearing 124) separate from the tread (e.g., until the circumferential lip 134 of the lower clam shell 130 is displaced from (or dislodged from) the channel 136 of the inner portion 132 of the tread (see, for example, FIG. 5, etc.), etc.).

At this point, the clamp 290 is moved (e.g., threaded, etc.) back up the shaft 268 of the fastener 266 and removed. And, the upper clam shell 128 and tread may be removed from the device 250 (FIG. 18), whereby the tread may be removed from the upper clam shell 128. The bearing 124, then, may be removed from the lower clam shell 130, and the lower clam shell 130 removed from the device 250. Once separated, the bearing 124 may then be placed back in the central openings 144 of the clam shells 128, 130, and the new, different, etc. tread may be placed back over the clam shells 128, 130. In this arrangement (as generally described above), then, the tread is generally disposed between, around, etc. the shoulders 138 of the clam shells 128, 130, and extends around the perimeter of the clam shells 128, 130. The fasteners 140, located toward the perimeter of the closing wheel 120, are replaced to secure (e.g., hold, lock, etc.) the clam shells 128, 130 together and the closing wheel 120 in the assembled arrangement.

It should again be appreciated, again, that the device 250 described herein may be used to remove, replace, change, etc. treads of other wheels, other than closing wheels of planters, in a similar manner the above. For instance, the device 250 may similarly be used to remove, replace, change, etc. treads of gauge wheels of planters, gauge wheels of cultivators, gauge wheels of seed drills, etc. (e.g., where such other wheels have a similar construction to the closing wheel 120 described above, including a pair of clam shells held together via a tread extending around a perimeter of the clam shells, etc.).

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 18,1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A device for removing a tread from a wheel of a machine, wherein the wheel of the machine includes first and second clam shells and a tread extending around a perimeter of the first and second clam shells, the device comprising:
   a body configured to support a wheel of a machine, wherein the body includes a cross member extending across an opening of the body and having a recess in a lower surface of the cross member, and wherein the wheel includes first and second clam shells forming the wheel;
   a fastener coupled to the body at the cross member, the fastener including a head disposed within the recess of the cross member, the fastener configured to engage the wheel when the wheel is supported by the body and position the wheel on the body; and
   a lock configured to engage the fastener and retain the head of the fastener in the recess of the cross member to thereby inhibit movement of the fastener relative to the body;
   wherein the fastener is configured to compress the wheel against the body to thereby allow removal of a tread from the first and second clam shells of the wheel while the wheel is supported on the body.

2. The device of claim 1, wherein the fastener includes a shaft configured to extend through an opening of the wheel, to thereby position the wheel on the body.

3. The device of claim 2, wherein the fastener further includes a clamp configured to move relative to the shaft, to thereby compress the wheel against the body.

4. The device of claim 3, wherein the clamp includes a nut configured to thread onto the shaft and move relative to the shaft.

5. The device of claim 1, wherein the body includes a lip extending around at least part of the opening defined by the body, and wherein the lip is configured to support the wheel on the body generally over the opening.

6. The device of claim 5, wherein the fastener extends away from the cross member such that an end portion of the fastener is disposed generally above a rim of the device.

7. The device of claim 1, wherein the opening defined by the body includes a diameter of at least about 10.75 inches.

8. The device of claim 1, wherein the fastener includes a shaft extending generally upward from the cross member; and wherein the shaft is configured to extend through an opening of the wheel to thereby position the closing wheel on the body.

9. The device of claim 1, wherein the lock includes a spring configured to bias the lock to a position positon to engage the fastener and inhibit movement of the fastener relative to the body.

10. The device of claim 1, wherein the lock is moveable between a first position in which the lock engages the fastener and inhibits movement of the fastener relative to the body and a second position in which the lock disengages the fastener and allows movement of the fastener relative to the body.

11. The device of claim 1, wherein the wheel is a closing wheel of a planter.

12. A method for removing a tread from a closing wheel of a planter, the method comprising:

providing a tread removal device comprising a body, wherein the body includes a cross member extending across an opening of the body and having a recess in a lower surface of the cross member, a fastener coupled to the body at the cross member and a lock configured to engage the fastener and retain a head of the fastener in the recess of the cross member to thereby inhibit movement of the fastener relative to the body;

actuating the lock of the tread removal device to secure the fastener of the tread removal device to the body of the tread removal device to inhibit movement of the fastener relative to the body:

positioning the fastener of the tread removal device through an opening of the closing wheel;

supporting the closing wheel on the body of the tread removal device, such that the closing wheel is disposed at least partly within an opening of the device; and actuating a clamp of the fastener to compress the closing wheel against the body, to thereby allow removal of a tread from the closing wheel while the closing wheel is supported on the body.

13. The method of claim 12, wherein positioning the fastener of the tread removal device through the opening of the closing wheel includes positioning a shaft of the fastener through a bearing of the closing wheel.

14. The method of claim 12, wherein supporting the closing wheel on the body of the tread removal device includes positioning a tread of the closing wheel on a rim of the tread removal device.

15. The method of claim 12, wherein actuating a clamp of the fastener includes threading the clamp onto a shaft of the fastener to thereby compress the closing wheel against the body of the tread removal device.

16. The method of claim 12, wherein the lock includes a spring configured to bias the lock to a position to engage the fastener and inhibit movement of the fastener relative to the body.

* * * * *